(12) United States Patent
Creighton et al.

(10) Patent No.: US 8,999,412 B2
(45) Date of Patent: Apr. 7, 2015

(54) COATED DRIED FRUIT AND/OR NUTS AND METHODS

(75) Inventors: Dean W. Creighton, Brooklyn Park, MN (US); Bryan Worwa, Elk River, MN (US)

(73) Assignee: General Mills, Inc., Minneapolis, MN (US)

( * ) Notice: Subject to any disclaimer, the term of this patent is extended or adjusted under 35 U.S.C. 154(b) by 855 days.

(21) Appl. No.: 12/730,739

(22) Filed: Mar. 24, 2010

(65) Prior Publication Data
US 2010/0227025 A1 Sep. 9, 2010

Related U.S. Application Data

(63) Continuation-in-part of application No. 12/604,509, filed on Oct. 23, 2009.

(60) Provisional application No. 61/109,330, filed on Oct. 29, 2008.

(51) Int. Cl.
| | | |
|---|---|---|
| A23L 1/36 | (2006.01) | |
| A23B 7/16 | (2006.01) | |
| A23B 7/154 | (2006.01) | |
| A23G 3/34 | (2006.01) | |
| A23B 7/02 | (2006.01) | |
| A23B 9/14 | (2006.01) | |
| A23L 1/00 | (2006.01) | |
| A23L 1/0534 | (2006.01) | |
| A23L 1/164 | (2006.01) | |
| A23L 1/212 | (2006.01) | |
| A23G 3/48 | (2006.01) | |
| A23G 3/54 | (2006.01) | |

(52) U.S. Cl.
CPC ............ *A23G 3/0085* (2013.01); *A23B 7/02* (2013.01); *A23B 7/0215* (2013.01); *A23B 7/16* (2013.01); *A23B 9/14* (2013.01); *A23G 3/0095* (2013.01); *A23L 1/0052* (2013.01); *A23L 1/0055* (2013.01); *A23L 1/0534* (2013.01); *A23L 1/1643* (2013.01); *A23L 1/2125* (2013.01); *A23L 1/364* (2013.01); *A23V 2002/00* (2013.01); *A23G 3/48* (2013.01); *A23G 3/54* (2013.01)

(58) Field of Classification Search
USPC .......................................... 426/102, 302, 309
See application file for complete search history.

(56) References Cited

U.S. PATENT DOCUMENTS

| | | | |
|---|---|---|---|
| 1,853,151 A | 4/1932 | Segur et al. | |
| 2,611,708 A | 9/1952 | Owens et al. | |
| 2,909,435 A | 10/1959 | Watters et al. | |
| 3,933,086 A | 1/1976 | Standing | |
| 4,356,197 A | 10/1982 | Devitt et al. | |
| 4,491,597 A * | 1/1985 | Varvil et al. .................. | 426/103 |
| 4,542,033 A | 9/1985 | Agarwala | |
| 4,696,824 A | 9/1987 | Meczkowski et al. | |
| 4,961,943 A | 10/1990 | Blanthorn et al. | |
| 5,194,278 A * | 3/1993 | Strong .......................... | 426/293 |
| 5,223,287 A | 6/1993 | Kearns et al. | |
| 5,364,643 A | 11/1994 | Morimoto et al. | |
| 5,376,391 A | 12/1994 | Misperos-Carriedo et al. | |
| 5,697,704 A | 12/1997 | Coyle | |
| 7,118,772 B2 | 10/2006 | Froseth et al. | |
| 2005/0053640 A1 | 3/2005 | Hettiarachchy et al. | |
| 2005/0214414 A1 | 9/2005 | Miranda et al. | |

FOREIGN PATENT DOCUMENTS

| | | |
|---|---|---|
| EP | 1550378 A1 | 7/2005 |
| EP | 1654933 A1 | 5/2006 |
| GB | 2016042 A | 9/1979 |
| GB | 2257891 A | 1/1993 |
| JP | 4190757 A | 7/1992 |
| JP | 6153783 A | 6/1994 |
| WO | WO 2004/032654 A1 | 4/2004 |
| WO | WO 2010/153774 | 5/2010 |

* cited by examiner

*Primary Examiner* — Nikki H. Dees
*Assistant Examiner* — Katherine D LeBlanc
(74) *Attorney, Agent, or Firm* — Diederiks & Whitelaw, PLC; Gregory P. Kaihoi

(57) ABSTRACT

Dried fruit has a coating of microcrystalline cellulose in an amount effective to prevent agglomeration of the dried fruit Methods of preparing and using the coated dried fruit are also described. The dried fruit pieces of the present invention are less sticky and are readily separated from one another using ordinary gravity feed handling conditions.

9 Claims, No Drawings

COATED DRIED FRUIT AND/OR NUTS AND METHODS

CROSS-REFERENCE TO RELATED APPLICATIONS

This application is a continuation-in-part application of U.S. Ser. No. 12/604,509 filed Oct. 23, 2009 and which claims the benefit of priority under 35 U.S.C. 119(e)(1) of a provisional patent application Ser. No. 61/109,330, filed Oct. 29, 2008, which is incorporated herein by reference in its entity.

FIELD OF THE INVENTION

The present invention relates to dried fruit and/or nut products and to their methods of preparation. More particularly, the present invention is directed towards improving the handling properties of dried fruits, such as raisins, nuts such as whole nut meats or slices, and blends of such dried fruit and nut pieces by providing the fruit and/or nut pieces with a particular coating.

BACKGROUND OF THE INVENTION

Dried fruits, such as raisins, can be difficult to handle in bulk, because the fruit tends to stick together to form large blocks. Blocking of such fruits is particularly problematical in the case of large scale production of combination food products, where a measured amount of a dried fruit is added to other components (such as in the manufacture of ready to eat cereals). When the dried fruit component is delivered to the assembly line suffering from blocking, steps must be taken to separate or "delump" the aggregated fruit before it can be added to other ingredients or otherwise manipulated. Conventionally, dried fruits are delumped by hand screening, or use of a machine. An apparatus for separating blocks of dried fruit is described in U.S. Pat. No. 3,933,086 and also in U.S. Pat. No. 5,697,704. Care must be taken to avoid damaging of the fruit in such deagglomeration operations.

Various solutions have been attempted in order to solve this blocking problem. While improvements can be achieved simply by refrigerating the fruit, this approach is quite costly and does not work very effectively. Coatings have been used on raisins, in particular, in order to prevent blocking. For example, raisins have been coated with sucrose, but this product has been subject to complaints regarding unattractive appearance. Further, the flavor of the raisins is noticeably changed due to the sucrose coating and the added sugar. Raisins have been coated with glycerol by spraying or by immersion in order to keep the raisins soft and pliable. (See, for example, U.S. Pat. No. 1,853,151). A process for improving the bulk handling, transportation and processing of raisins is described in U.S. Pat. No. 4,696,824, wherein raisins are coated with glycerine and oil to enhance bulk handling, transportation and processing. U.S. Pat. No. 5,223,287 describes an alternative approach, whereby dried fruits are stated to have improved handling and physical properties by coating the fruits with a finely divided, specially prepared calcium citrate reaction product.

SUMMARY OF THE INVENTION

Dried fruit and nut pieces are provided with a coating of microcrystalline cellulose in an amount effective to mitigate agglomeration, bridging or weeping of the pieces. Surprisingly, it has been found that pieces such as dried fruit and/or nuts that are provided with this coating exhibit greatly reduced tendency to blocking that might require additional processing steps to break up into discrete pieces. Rather, the dried fruit and/or nut pieces of the present invention are less sticky and readily separated from one another using ordinary gravity feed handling conditions. Further, the dried fruit and/or nut blend is not significantly altered in flavor or appearance by use of the microcrystalline cellulose. The coated pieces thus are not unduly sweetened or otherwise modified by the present coating. The dried fruits and/or nuts or blends of the present invention also exhibit a surprising handling shelf life, meaning that the fruit and/or nuts or blends can be stored for prolonged periods of time with minimal blocking.

The amount of microcrystalline cellulose used to coat the dried fruit and/or nuts can be very small and thereby not readily visibly apparent, and the final consumer therefore may not even perceive that such a coating has even been applied to the dried fruit and/or nuts. In certain embodiments, the microcrystalline cellulose can only be perceived visually by the unaided eye for a short time period. After a short time, ambient liquids from the fruit or other sources are absorbed by the microcrystalline cellulose, rendering the coating transparent and not generally visually perceivable. The coated fruits and/or nuts can also include a topical coating such as a fat or sugar based coating or seasoning blend.

Methods of treating dried fruit and/or nuts and blends to prevent agglomeration of the dried fruit by applying a coating of microcrystalline cellulose to the fruit and/or nuts are also provided. The thus treated dried fruit and/or nuts are useful as a consumable food product by itself, or can be mixed with additional food components to provide a combination food product whether in the form of a loose aggregate such as an RTE cereal, e.g., with raisins and/or nuts, or in the form of a solid agglomeration such as a granola bar.

DETAILED DESCRIPTION OF PRESENTLY PREFERRED EMBODIMENTS

The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

For purposes of the present invention, "dried fruit" is fruit from which a portion, but not all, moisture has been removed ("dehydrated"). In embodiments of the present invention, the moisture content of the dried fruit is from about 5 to about ≈25% (≈5-25%). The dried fruit of the present invention comprises a sufficient amount of moisture so that, untreated, the fruit will block. In an embodiment of the present invention, the dried fruit as a water activity ($A_w$) of from ≈0.15 to ≈0.75, with a preferred water activity range of ≈0.4 and ≈0.6. Drying fruits to very low water levels indicated by low water activity values, e.g., below ≈0.3, for better handling properties or to avoid moisture equilibration with dried cereal generally result in such dried fruits being extremely tough and leathery and thus difficult to consume.

Optionally, the dried fruit is additionally provided with a humectant or oils, which may be infused or topically applied to improve the texture properties of such dried fruits. In an embodiment of the present invention, humectants are selected from the group consisting of glycerin, glycerol, propylene glycol, corn syrup, dextrose, honey, fructose, high fructose corn syrup, and mixtures thereof. Optionally, the dried fruit can be coated with an edible humectant containing gel, as described in U.S. Pat. No. 5,364,643. For example, dried fruits have been infused with sugars (i.e. a monosaccharide or disaccharide) to moderate the problems of fruit moisture loss and food product moisture gain. Infusing sugars such as honey into fruits, e.g., dates, prior to drying has been practiced from ancient times to lower the water activity while providing dried fruit products that are softer in texture. More recently, refined sugars such as sucrose, fructose and dextrose or corn syrups have been used to infuse dried fruits. (See, for example, U.S. Pat. No. 4,542,033 "Sugar and Acid Infused Fruit Products and Processes Therefor" issued Sep. 17, 1985 to Agarwala.)

Optionally, the fruit may be infused with inulin and dried, as described in U.S. Pat. No. 7,118,772 and/or with polydextrose. Optionally, the dried fruit may be provided with an additional coating, such as a sugar coating in the form of an initially dry, crystalline sucrose coating.

In an embodiment of the present invention, the dried fruit is free of any dry external additive other than the coating of microcrystalline cellulose. In another embodiment of the present invention, the dried fruit is free of any external additive other than the coating of microcrystalline cellulose. In an embodiment of the present invention, the dried fruit is free of any internal or external additive other than the coating of microcrystalline cellulose except for humectant and optionally added water. In another embodiment of the present invention, the dried fruit is free of internal or external added monosaccharide or disaccharide. In another embodiment of the present invention, the dried fruit is free of any internal or external additive other than the coating of microcrystalline cellulose except for a non-monosaccharide or disaccharide humectant and optionally added water. In an embodiment of the present invention, the dried fruit is free of any internal or external additive other than the coating of microcrystalline cellulose except for optionally added water.

Dried fruit can prepared by any suitable techniques, such as by drying in the sun or by machine.

Examples of dried fruits include dates, figs, raisins, prunes or dehydrated fruits selected from apples, apricots, blackberries, blueberries, banana, cherries, cranberries, currants, mango, pineapple, peaches, raspberries, strawberries, tomato, and mixtures thereof.

In certain RTE cereal product variations, blends of dried fruit pieces can be combined with RTE cereal pieces. Also, nut pieces or blends of several nut types can be combined with the RTE cereal. In still other variations, blends of dried both fruit pieces and nut pieces of one or more nut types can be combined to provide a composite RTE cereal products.

Regardless of the particular RTE or other food product, the handling of dried fruit pieces, whether of a single type or blends of several types, problems such as bridging or blocking in the bulk handling of the dried fruit. Such problems are more likely to occur or be more severe under hot and humid conditions whether weather or climate related or due to conditions within a production facility. Such problems can also occur in the handling or transfer of blends of fruit pieces that include other ingredients inclusions such as nut pieces.

Likewise, problems can arise in the bulk handling of nut pieces whether whole nuts, or pieces, whether broken or cut. In addition to bridging, still another problem with nut pieces can be the release of nut oil from the nut pieces. Such release during handling and processing can be a maintenance and sanitation concern requiring more cleaning efforts to remove any such released oil. During product storage, oil relaease can adversely affect product quality and by transfer or migration can degrade packaging material or any other material in contact with the nut pieces. For example, the oil may transfer to an RTE cereal piece in contact with the nut pieces. In other variations, the oil can interact with a coating applied to the nut pieces. For example, nut pieces can have a sugar coating or sugar-based coating that can be softened by the release nut oil over time leading to failure of the coating. In still other variations, the nuts can be coated with a fat based or sweetened fat based coating, e.g., a chocolate, or sweetened chocolate or sweetened milk chocolate coating. The sweetened chocolate coating can also include a topical or outside sugar based top coating.

The present invention finds particular suitability for use in connection with common commercially available nut types such as almonds, brazil nuts, cashews, chestnuts, hazel nuts, macadamia nuts pecans, peanuts, pinenut, pistachio, walnuts and mixtures thereof. The term "nuts' herein can also be applied to edible seeds especially seeds such as sunflower seeds, pumpkin seeds, The dried fruit and/or nut can be provided in the form of whole pieces or diced or otherwise segregated or sectioned. In an embodiment of the present invention, the dried fruit is provided in diced or otherwise sectioned portions having at least one dimension of from ≈0.5 to ≈10 cm, or from ≈1 to ≈5 cm. In certain variations, the nut pieces can be sliced, e.g., sliced or slivered almond pieces.

As noted above, microcrystalline cellulose is applied to the surface of the dried fruit and/or nut pieces. The application can be applied either to single ingredients prior to blending or to pre-blends of fruits and/or nuts. For example, a pre-blend of one or more types of dried fruit pieces admixed with, for example, sliced or slivered almonds, can be made and the present coating applied to such pre-blends.

Microcrystalline cellulose is a naturally occurring polymer derived from alpha cellulose sources, wherein the crystalline portions of the cellulose material have been partially or completely isolated from amorphous portions. Microcrystalline cellulose is widely used in the pharmaceutical industry in the formation of tablets. The microcrystalline cellulose may be derived from any appropriate cellulose source, such as wood pulp and the like.

Commercially available microcrystalline cellulose products include Avicel™ from FMC BioPolymer and LIBRAWCEL™ from Libraw Pharma and typically include 5 to ≈20% sodium carboxymethycellulose. The degree of polymerization of microcrystalline cellulose is typically less than 400.

In an embodiment of the present invention, the microcrystalline cellulose has an average particle size of from ≈50 to ≈250 microns, with a smaller size being less visible on the fruit.

In an embodiment of the present invention, the microcrystalline cellulose is present at a coating weight of from ≈1 to ≈10 grams per kilogram of fruit. In another embodiment, the microcrystalline cellulose is present at a coating weight of from ≈2 to ≈7 grams per kilogram of fruit. In another embodiment, the microcrystalline cellulose is present at a coating weight of from ≈4 to ≈5 grams per kilogram of fruit.

The microcrystalline cellulose is applied to the fruit and/or nuts or blends using any appropriate dry mixing system. For example, the microcrystalline cellulose can be applied by a continuous enrober set-up, where the dry microcrystalline cellulose is added onto the fruit or nut pieces at the appropriate application ratio, as the fruit or nuts tumble in the rotating enrober. A batch mixer can also be used, with care taken to use minimal shear so as not to disrupt the fruit structure or to minimize nut piece breakage.

Preferably, microcrystalline cellulose is applied after the fruit has been dried. More preferably, the microcrystalline cellulose is applied to the fruit at the site of drying or at the nut processing facility and before transportation to a second manufacturing site in boxes or totes. Preferably, the microcrystalline cellulose is applied to the fruit before the dried fruit has had an opportunity to develop significant blockage that would require separation of fruit pieces, thereby avoiding the potential for damage to the fruit and additionally the need to carry out a costly and inconvenient separation step. Also, by avoiding or minimizing blocking, the danger to operators of manual de-blocking can be beneficially reduced.

In an embodiment of the present invention, a dried fruit supplier provides fruit and dehydrates the fruit to a desired water activity level. Before or more preferably after dehydration, the supplier applies a coating of microcrystalline cellulose in an amount effective to prevent agglomeration of the dried fruit. The dried, coated fruit can then be packaged for shipment to a manufacturing customer for use in a food preparation process. Likewise, a nut processor applies the coating to nut pieces prior to bulk packaging and shipment to a manufacturing consumer for use in a food product preparation process (e.g., admixture to RTE cereal pieces to form a composite cereal product).

In another embodiment of the present invention, a food manufacturer places an order with a dried fruit supplier for dried fruit or nut processor having a coating of microcrystalline cellulose in an amount effective to minimize or reduce agglomeration of the dried fruit. Upon receipt of this coated dried fruit, the food manufacturer conducts further processing operations to package the coated dried fruit, either alone or in combination with other products or in combination with additional food components to provide a combination food product.

In another embodiment of the present invention, a food manufacturer places an order with a dried fruit supplier for dried fruit. Upon receipt of the dried fruit, the food manufacturer carries out optional fruit unblocking operations as needed, and applies a coating of microcrystalline cellulose in an amount effective to prevent agglomeration of the dried fruit. The food manufacturer then conducts further processing operations to package the coated dried fruit, either alone or in combination with other products or in combination with additional food components to provide a combination food product.

The coated dried fruit can be used in its dehydrated state, or reconstituted in water, or can be reconstituted in situ by adding the fruit to liquid food ingredients. Coated dried fruit may be eaten out of hand or used as an ingredient in combination products in baked goods, fruit compotes, stuffings, conserves and the like. Optionally, the coated dried fruit may be packaged with other food components and/or articles for assembly by the consumer. For example, coated raisins can be packaged with celery sticks, peanut butter and a spreading tool to apply the peanut butter to the celery and to position the raisins thereon.

Combination food products can be in solid, plastic or semi-solid form. In solid form, the products can be in a loose particulate form or in the form of a mass. For example, the present dried fruit and/or nut products find particular suitability for use for inclusion as a functional food ingredient in ready to eat ("RTE") cereals. Such ready to eat cereals are food products in particulate solid form especially in the form of flakes, puffs, shreds, biscuits and mixtures thereof. Preferred examples of RTE cereal products include corn or wheat flakes. Bran flakes with raisins are well known. Also, loose particulate forms can include dry mixes for hot oatmeal or other hot cereals (e.g., wheat or farina hot cereals). In other variations, the present coated dried fruits and nuts can be admixed with other ingredients to provide a baking dry mix such as for a baked dessert item, quick bread. Both retail or consumer as well as food service product executions are contemplated.

Combination food products can also be in the form of a mass, e.g., a cereal bar, cereal piece clusters or cereal or snack nuggets. The term "cluster" as used herein generally refers to small grain/cereal pieces aggregated together with a sugar-based matrix typically about fifty to sixty-five percent (50-65%) grains and thirty to fifty percent (30-50%) sugar-based matrix. Occasionally other items like diced nuts, etc. are incorporated into the cluster aggregate The dried fruit pieces and/or nuts can be admixed with the cereal and formed into a bar such as with a binder. In other variations, the bars can include a separate layer or region including the fruit and/or nut pieces. The dried fruit pieces can be admixed, if desired with a fruit paste or puree. Good results are obtained when the dried fruit and/or nut food product comprises a minor portion, e.g., ≈1% to ≈40%, preferably ≈15% to ≈35% of the ready to eat cereal while the cereal particulates or cereal base (of one or more types) comprise the major or principal portion, e.g., ≈60% to ≈99% of the composite product. Other typical ready to eat cereal inclusions ingredients such as, dried marshmallow pieces can be additionally admixed with the blend of the present dried fruit products and ready to eat cereal base.

In still other variations, the microcrystalline cellulose coated dried fruits and/or nuts can be beneficially supplied in bulk to a confectioner that applies thereto a coating such as a chocolate coating to provide, for example, chocolate coated raisin as a confection food item or sugar based coating. In certain products, such coatings can be combined, e.g., a nut piece such as a peanut or almond having a first or inner coating of a fat based coating such as milk chocolate and a second or outer sugar based top coating. Providing the dried fruit and/or nuts in the form of coated, free-flowing, dried fruit can greatly facilitate handling in such commercial coating operations.

In other variations, the present dried fruit and/or nut products in piece form can be added to a variety of other shelf stable food products such as dry mixes for baked goods or goods to be prepared by a commercial or home customer (such as dry mixes for layer cakes, muffins or pancakes), snack or trail mixes (of pretzels, nuts, cereal pieces, candies, dried meats pieces, and mixtures thereof, some versions of which are commonly known as granola).

The present dried fruit and/or nut products also find suitability for use for inclusion into a wide variety of dairy products, both refrigerated and frozen. For example, the present dried fruit products can be added to the yoghurt to provide products that not only provide the nutrition and taste appeal of fruit and/or nuts. Also, the present dried fruit and/or nut products can be added to a variety of aerated frozen dairy products such as ice cream or soft serve frozen dairy products. The presence dried fruit and/or nut products can be added to other nondairy frozen especially aerated frozen desserts such as sorbets. Good results are obtained when the added dried fruit is present as ≈1% to ≈35%, preferably ≈10% to ≈30% of the dairy product.

The present coated food products especially coated nut pieces find particular suitability for use for inclusion or as an ingredient in confections and candies such as chocolate coated nuts wherein the chocolate coating is a minor portion of the food product, and candy bars wherein the coated nut products are the minor portion of the food product, nut brittles (e.g., peanut brittle) as well as in snack mixes, seasoned nut products (e.g., seasoned roasted or honey roasted peanuts or smoked almonds).

All combinations of the independently listed variables of the present description (e.g., fruit identity, coating weight, identity of coating component, water activity, and the like) are expressly contemplated as if individually described.

EXAMPLES

Representative embodiments of the present invention will now be described with reference to the following examples that illustrate the principles and practice of the present invention.

Example 1

Dried glycerated raisins are added into a continuous enrober at a prescribed rate. A small loss in weight feeder (SCHENCK AccuRate Inc., Whitewater, Wis.) is used to add 4.1 g per kg raisins of microcrystalline cellulose (FMC Avicel RC-591) to the raisins. Coated raisins exit the enrober and are packed in 30 lbs cases. They remain free flowing during storage, and can be dumped into a packaging system without the use of a delumper.

All patents, patent applications (including provisional applications), and publications cited herein are incorporated by reference as if individually incorporated for all purposes. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of preparing nut pieces comprising:
   a) placing an order for nuts pieces with a nut supplier;
   b) receiving shipment of the ordered nut pieces;
   c) carrying out optional nut unblocking operations as needed, and applying a coating of dry microcrystalline cellulose in an amount effective to prevent agglomeration of the nut pieces; and
   d) conducting further processing operations to package the nut pieces, either alone or in combination with other products or in combination with additional food components to provide a combination food product.

2. A method of preparing nut pieces of claim 1, wherein the nut pieces are mixed with additional food components to provide a combination food product, with the additional food components being dried fruit also coated with dry microcrystalline cellulose.

3. Coated nut meat pieces having a coating of microcrystalline cellulose in an amount effective to minimize nut oil transfer from the nut pieces during storage.

4. The coated nut meat pieces of claim 3, wherein the microcrystalline cellulose has an average particle size of from ≈50 to ≈250 microns.

5. The coated nut meat pieces of claim 4, wherein the microcrystalline cellulose is present at a coating weight of from ≈1 to ≈10 grams per kilogram of nut pieces.

6. The coated nut meat pieces of claim 5 wherein at least a portion of the nut pieces are sliced or slivered nut pieces.

7. The coated nut meat pieces of claim 4 wherein at least a portion of the coated nut meat pieces includes a fat or sugar based coating.

8. A method of preparing a combination food product comprising:
   applying a dry coating of microcrystalline cellulose to nut pieces in an amount effective to minimize nut oil transfer from the nut pieces during storage; and
   mixing the coated nut pieces with additional food components to provide a combination food product.

9. A method of preparing a combination food product of claim 8, wherein the additional food components include dried fruit also coated with dry microcrystalline cellulose.

* * * * *